United States Patent [19]
Ito et al.

[11] Patent Number: 5,242,965
[45] Date of Patent: Sep. 7, 1993

[54] VINYL CHLORIDE RESIN COMPOSITION

[75] Inventors: Yuichi Ito; Katsuoki Uemura; Masafumi Yamanouchi, all of Chibaken, Japan

[73] Assignee: Chisso Corporation, Osaka, Japan

[21] Appl. No.: 926,370

[22] Filed: Aug. 7, 1992

Related U.S. Application Data

[63] Continuation of Ser. No. 748,519, Aug. 22, 1991, abandoned.

[30] Foreign Application Priority Data

Aug. 29, 1990 [JP] Japan .................................. 2-226903

[51] Int. Cl.$^5$ .............................................. C08K 5/04
[52] U.S. Cl. .................................. 524/377; 524/386; 524/387; 524/503; 525/331.5
[58] Field of Search ............... 524/377, 386, 387, 503; 525/57, 331.5

[56] References Cited

U.S. PATENT DOCUMENTS 4,840,842  6/1989  Yamaguchi et al. ................ 428/323

FOREIGN PATENT DOCUMENTS

| 113802 | 12/1973 | Japan | .................................. 524/503 |
| 53-42057 | 11/1978 | Japan . | |
| 58-83039 | 5/1983 | Japan . | |
| 179849 | 5/1983 | Japan . | |
| 1-185313 | 7/1989 | Japan . | |
| 1-254725 | 10/1989 | Japan . | |

Primary Examiner—Paul R. Michl
Assistant Examiner—LaVonda DeWitt
Attorney, Agent, or Firm—Leydig, Voit & Mayer

[57] ABSTRACT

A vinyl chloride resin composition having far improved compression set and heat deformation resistance and further having a superior tensile strength, wear resistance and processability is provided. The composition includes 1 to 100 parts by weight of a polyol compound and 1 to 100 parts by weight of a crosslinking agent (e.g., a polyisocyanate compound) blended with 100 parts by weight in total of 1 to 100 parts by weight of a crosslinkable vinyl chloride resin and 99 to 0 parts by weight of a vinyl chloride resin, wherein the crosslinkable vinyl chloride resin is a copolymer or vinyl chloride monomer with an active hydrogen atom-containing unsaturated monomer. The composition may further comprise a plasticizer and/or a rubbery material.

17 Claims, No Drawings

VINYL CHLORIDE RESIN COMPOSITION

This application is a continuation of application Ser. No. 07/748,519, filed Aug. 22, 1991, abandoned.

BACKGROUND OF THE INVENTION

1. Field of the Invention

This invention relates to a vinyl chloride resin composition having notably improved compression set and heat deformation resistance and also having a superior tensile strength, wear resistance and processability.

2. Description of the Related Art

Soft vinyl chloride resin is a material affording, when molded, a product having a touch similar to that of rubber, and also having superior processability, physical properties and well-balanced cost. Thus, the resin has been used as a material for automobiles, machines, electrical products, medical products, architecture, etc., in various and broad fields. However, as compared with vulcanized rubber, the material has drawbacks of larger compression set, inferior heat deformation properties, etc.; thus its use has been limited.

As techniques for overcoming such drawbacks, a technique of using a vinyl chloride resin having a higher polymerization degree and a technique of using a partially cross-linked vinyl chloride resin have so far been known. However, according to these techniques, the improvement has been limited, and the compression set is still high and the heat deformation properties are also inferior so that the improvement cannot be regarded as sufficient.

Further, a technique of mixing a cross-linked rubber component with a partially cross-linked vinyl chloride resin has also been known. However, according to this technique, when the rubber component represents a larger proportion, a compression set similar to that of vulcanized rubber is afforded, but with an increase in the content of the vinyl chloride component, the compression set and heat deformation properties are both lower. Thus, in order to afford a compression set matching that of vulcanized rubber, a large quantity of the rubber component is required so that cost increase is inevitable and also the superior properties of the vinyl chloride resin are damaged.

On the other hand, a technique of blending a polyisocyanate compound with a vinyl chloride resin has been known. Japanese patent application laid-open No. Sho 51-31750 (Japanese patent publication No. Sho. 53-42057) discloses a process for improving the compression set and heat deformation properties of a vinyl chloride resin, by blending a polyisocyanate as a crosslinking agent with a vinyl chloride resin obtained according to an emulsion polymerization process and containing a hydroxyl group or a carboxyl group in its molecule. However, according to this process, since the vinyl chloride resin is crosslinked with a polyisocyanate, there are drawbacks that the hardness of the resulting polymer increases, its flexibility decreases, etc. Further, according to the process, while the polymer obtained according to the emulsion process can be processed according to a coater process, the whole of the resulting composition is crosslinked in the case of a more general processing process such as extrusion molding, injection molding, etc., accompanied with a higher temperature kneading; thus only a product having inferior surface properties is obtained.

Japanese patent application laid-open Nos. Hei 1-185313 and Hei 1-254725 disclose a polyvinyl chloride-polyurethane composite material obtained by subjecting a polyol-containing vinyl chloride polymer and a polyisocyanate compound to a urethanization reaction. However, according to this process, the polyvinyl chloride and the polyurethane are only homogeneously dispersed or partly bound to the resulting chain, but the polyvinyl chloride and the polyurethane do not form any co-crosslinked structure; thus no improvement in the compression set and heat deformation properties is exhibited so that such a process cannot be regarded as a suitable process.

Further, Japanese patent application laid-open No. Sho 5-83039 discloses a process of impregnating a polyvinyl chloride resin with a polyol compound and a polyisocyanate compound and forming a polyurethane in the polyvinyl chloride resin. However, according to this process, too, as in the above process, the polyvinyl chloride and the polyurethane do not form any co-crosslinked structure; hence no improvement in the compression set and heat deformation resistance is exhibited so that such a process cannot be rendered as a suitable process.

SUMMARY OF THE INVENTION

The object of the present invention is to provide a vinyl chloride resin composition having overcome the above-mentioned drawbacks and having superior compression set and heat deformation resistance and further superior tensile strength, wear resistance and processability.

The present inventors have made extensive research in order to improve the compression set and heat deformation properties, and as a result, have found that these properties are notably improved by crosslinking a crosslinkable vinyl chloride resin and a polyol compound with a crosslinking agent and further that the tensile strength, wear resistance and processability are improved; thus we have completed the present invention.

Namely, the present invention resides in a vinyl chloride resin composition characterized by blending a polyol compound and a crosslinking agent with a crosslinkable vinyl chloride resin.

DETAILED DESCRIPTION OF PREFERRED EMBODIMENTS

The crosslinkable vinyl chloride resin used in the present invention refers to a vinyl chloride resin obtained by copolymerizing 99.98 to 50 mol % of vinyl chloride monomer with 0.02 to 50 mol % of an unsaturated monomer containing an active hydrogen atom (hereinafter referred to as comonomer) according to suspension polymerization process, and having an average polymerization degree of 300 to 5,000.

Examples of the comonomer are (i) unsaturated monomers containing carboxyl group(s) such as unsaturated monocarboxylic acids e.g. acrylic acid, methacrylic acid, crotonic acid, cinnamic acid, etc., unsaturated dicarboxylic acids e.g. maleic acid, fumaric acid, itaconic acid, citraconic acid, etc., and monoesters of unsaturated dicarboxylic acids, e.g. monomethyl maleate, monoethyl maleate, etc.; (ii) unsaturated monomers containing hydroxyl group such as esters of acrylic acid or methacrylic acid, e.g. hydroxyethyl acrylate, hydroxypropyl acrylate, hydroxyethyl methacrylate, hydroxylpropyl methacrylate, vinyl ethers such as vinyl 4-hydroxybutyl ether, vinyl esters such as vinyl 12- hydroxystearate, allyls such as allyl alcohol, o-allylphenol, glycerol allyl ether, etc., (iii) unsaturated monomers containing an amido group such as acrylamide, N-methylolacrylamide, diacetone acrylamide, etc.

The crosslinkable vinyl chloride resin has an average polymerization degree of 300 to 5,000, as described above, preferably 1,000 to 4,000. If the average polymerization degree is less than 300, the mechanical properties of the resulting molded product are reduced, while if it exceeds 5,000, the molding temperature is raised to make its processability difficult. On the other hand, the content of the comonomer is 0.02 to 50 mol %, as described above, preferably 0.1 to 10 mol %. If it is less than 0.02 mol %, crosslinkability is insufficient, while if it exceeds 50 mol %, the superior physical properties of the resulting vinyl chloride resin are damaged.

In the production of the crosslinkable vinyl chloride resin of the present invention, it is possible to use an unsaturated monomer used for usual vinyl chloride copolymers, as a copolymerization component, besides vinyl chloride monomer and comonomers having active hydrogen.

Examples of such an unsaturated monomer are α-olefins such as ethylene, propylene, butylene, etc., vinyl esters such as vinyl acetate, vinyl propionate, vinyl stearate, etc., vinyl ethers such as vinyl methyl ether, vinyl ethyl ether, vinyl isobutyl ether, vinyl phenyl ether, etc., unsaturated carboxylic acids such as acrylic acid, methyl acrylate, etc., vinylidenes such as vinylidene chloride, vinylidene fluoride, etc., vinyl aryls such as styrene, vinyltoluene, methoxystyrene, divinylbenzene, chlorostyrene, dichlorostyrene, α-vinylnaphthalene, etc., unsaturated nitriles such as acrylonitrile, etc.

In the present invention, it is possible to use a usual vinyl chloride resin together with the crosslinkable vinyl chloride resin. As such a vinyl chloride resin, it is possible to use vinyl chloride homopolymer or a copolymer of vinyl chloride with at least one member of the above unsaturated monomers, alone or in admixture. By simultaneous use of the vinyl chloride resin, it is possible to improve the processability of the resulting composition, but if the content of the vinyl chloride resin exceeds 99 parts by weight based upon the total of 100 parts by weight of the crosslinkable vinyl chloride resin and the vinyl chloride resin, the effectiveness of the present invention, i.e. that of improving the compression set or the heat deformation properties, is reduced. As to the preparation of the vinyl chloride resin, known polymerization processes, such as suspension polymerization process, emulsion polymerization process, bulk polymerization process, solution polymerization process, etc., are applicable.

As the polyol compound to be blended with the crosslinkable vinyl chloride resin, compounds having at least two hydroxyl groups on an average per one molecule are broadly suitable. Examples are (a) polyols such as ethylene glycol, diethylene glycol, triethylene glycol, 1,2-propylene glycol, dipropylene glycol, trimethylene glycol, 1,4-butylene glycol, 1,3-butylene glycol, tetramethylene glycol, neopentyl glycol, hexamethylene glycol, decamethylene glycol, glycerine, trimethylol propane, pentaerythritol, sorbitol, etc.; (b) polyether polyols obtained by addition-polymerizing at least one compound of ethylene oxide, propylene oxide, butylene oxide, tetrahydorfuran, styrene oxide, etc. to at least one compound having at least two active hydrogen atoms on an average in one molecule such as polyols illustrated in the above (a), sucrose, aconitic acid, trimellitic acid, hemimellitic acid, ethylenediamine, propylenediamine, diethylenetriamine, triethanolamine, pyrogallol, dihydrobenzoic acid, hydroxyphthalic acid, resorcin, hydroquinone, 2,2-bis(4'-hydroxyphenyl)propane, 4,4'-dihydroxyphenylmethane, 1,2-propanedithiol, etc.; (c) polyester polyols obtained by polycondensing at least one member of polyols illustrated in the above (a) to at least one compound having at least two carboxyl groups in its molecule, such as malonic acid, maleic acid, succinic acid, adipic acid, tartaric acid, pimelic acid, sebacic acid, oxalic acid, phthalic acid, terephthalic acid, hexahydrophthalic acid, aconitic acid, trimellitic acid, hemimellitic acid, etc.; (d) acrylic polyols obtained by copolymerizing at least one acrylic monomer having an active hydrogen atom, such as acrylic acid, methacrylic acid, maleic acid, itaconic acid, 2-hydroxymethyl acrylate, 2-hydroxymethyl methacrylate, 2-hydroxyethyl acrylate, 2-hydroxyethyl methacrylate, hydroxypropyl acrylate, hydroxypropyl methacrylate, acrylamide, N-methylolacrylamide, diacetone acrylamide, etc., with at least one vinyl compound such as methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, n-hexyl methacrylate, lauryl methacrylate, styrene, vinyltoluene, vinyl acetate, acrylonitrile, etc.; (e) substances having rubber materials such as polybutadiene, hydrogenated polybutadiene, polyisoprene, hydrogenated polyisoprene, NBR, EPR, EPDM, chloroprene, chlorosulfonated PE, chlorinated PE, etc., modified with hydroxyl groups. The quantity of these polyol compounds blended is preferably 1 to 100 parts by weight based upon the total of 100 parts by weight of the crosslinkable vinyl chloride resin and usual vinyl chloride resin. If it is less than 1 part by weight, the compression set lowers, while if it exceeds 100 parts by weight, the processability and the productivity are reduced.

As the crosslinking agent to be blended with the polyol compound, those having a crosslinking function upon the crosslinkable vinyl chloride resin and the polyol compound in blended state may be broadly applicable, but polyisocyanate compounds are particularly preferred. The polyisocyanate compounds are those having been usually used for polyurethane production. Examples thereof are polyisocyanate monomers such as aliphatic diisocyanates, e.g. hexamethylenediisocyanate, lysinediisocyanate, etc., alicyclic diisocyanates, e.g. hydrogenated diphenylmethanediisocyanate, isophoronedicyanate, hydrogenated tolylene diisocyanate, etc., aromatic diisocyanates, e.g. tolylene diisocyanate, diphenylmethane diisocyanate, xylene diisocyanate, naphthalene 1,5-diisocyanate, etc., polymers of the foregoing or urethane prepolymers using the foregoing.

The quantity of these polyisocyanate compounds blended are preferably 1 to 100 parts by weight based upon the total of 100 parts by weight of the crosslinkable vinyl chloride resin and the usual vinyl chloride resin. If it is less than 1 part by weight, the effectiveness of improving the compression set and the heat deformation properties are reduced, while if it exceeds 100 parts by weight, the processability and the productivity are reduced.

The composition of the present invention may further contain a plasticizer. The kind of the plasticizer is not particularly limited, but known plasticizers may be used. Examples of the plasticizer are phthalic acid plasticizers, trimellitic acid plasticizers, aliphatic monobasic acid ester plasticizers, aliphatic dibasic acid ester plasticizers, aromatic ester plasticizers, hydroxy acid ester plasticizers, phosphoric acid ester plasticizers, polyester plasticizers, etc.

The quantity of these plasticizers blended is preferably 0 to 200 parts by weight based upon the total of 100 parts by weight of the crosslinkable vinyl chloride resin and usual vinyl chloride resin. If it exceeds 200 parts by weight, the processability and the productivity are reduced.

Further, the composition of the present invention may also contain a rubbery material. The kind of rubbery material has no particular limitation, but known rubbery materials may be used. Examples thereof are natural rubber, isoprene rubber, styrene-butadiene rubber, butadiene rubber, chloroprene rubber, acrylonitrile-butadiene rubber, butyl rubber, ethylene-propylene rubber, urethane rubber, silicone rubber, chlorosulfonated polyethylene, chlorinated polyethylene, acrylic rubber, epichlorohydrin rubber, fluorinated rubber, polysulfide rubber, etc. Any one of non-crosslinked material, partially crosslinked material or completely crosslinked material thereof may be used alone or in admixture.

The quantity of these rubbery materials blended is preferably 0 to 200 parts by weight based upon the total 100 parts by weight of the crosslinkable vinyl chloride resin and the usual vinyl chloride resin. If it exceeds 200 parts by weight, the processability is sufficiently reduced to adversely affect the superior properties of the vinyl chloride resin and also raise the cost.

Further, in the composition of the present invention, additives used for usual vinyl chloride resins such as stabilizers, processing aids, lubricants, fillers, pigments, etc. may also be used if necessary.

Preparation of the composition of the present invention may be preferably carried out by blending the respective components by means of usual ribbon blender, Henschel mixer, etc., followed by uniformly kneading the blend by means of machines such as mill roll, Banbury mixer, extruder, etc.

EXAMPLE

The present invention will be described in more detail by way of Examples and Comparative examples, but it should not be construed to be limited thereto.

In addition, the evaluation methods carried out in Examples and Comparative examples relied on the following methods:

(1) Compression set: carried out according to JIS K-6301, at a heat-treatment temperature of 70° C. and for 22 hours.
(2) Percentage of heat deformation: carried out according to JIS K-6723. In addition, the smaller the measurement value, the better the heat deformation properties.
(3) Tensile strength: carried out according to JIS K-6301. As the shape of the test piece, dumbbell specimen No. 3 was employed.
(4) Appearance of pressed film: The surface smoothness of a test piece prepared by means of a press tester was judged by the naked eye.
Judgement:
 ⊚: far superior surface smoothness.
 ○: superior surface smoothness.
 ×: inferior surface smoothness.

(5) Appearance of extrusion-molded product: The surface smoothness of a test piece prepared by means of a single-screw extruder (40 mm) made by Japan Steel Co., Ltd. was judged by naked eyes.
Judgement:
 ⊚: far superior surface smoothness
 ○: superior surface smoothness
 ×: inferior surface smoothness
(6) Wear resistance: The wear resistance of a test piece prepared by means of a press tester was tested by means of a tapered wear tester. The wear state observed using a truck wheel H-22 was judged by naked eyes.
Judgement:
 ⊚: far superior wear resistance
 ○: superior wear resistance
 ×: inferior wear resistance

EXAMPLE 1

Vinyl chloride monomer (98.7 mol %) and 2-hydroxyethyl acrylate (1.3 mol %) were suspension-polymerized at 63° C. to obtain a crosslinkable vinyl chloride copolymer resin (hereinafter referred to as crosslinkable PVC-1) having a polymerization degree of 800 and containing 10 hydroxyl groups on an average per one molecule.

With this crosslinkable PVC-1 (100 parts by weight) were mixed 3,3-dimethylolheptane-adipic acid polycondensate (hereinafter referred to as polyol compound-1) as a polyester polyol (4 parts by weight) having a molecular weight of 2,800 and a hydroxyl group value of 36.1 KOH mg/g, a non-yellowing type isocyanate prepolymer (Burnock DN-955 ®, made by DIC Co., Ltd.) as a crosslinking agent (10 parts by weight) containing NCO (6.0%) (hereinafter referred to as crosslinking agent) (10 parts by weight) and DOP, a Ba-Zn stabilizer and a Ba-Zn chelator (50 parts by weight, 2 parts by weight and one part by weight, respectively), in a beaker, followed by melt-kneading the mixture by means of a roll tester set to 110° C. to obtain a composition.

This composition was compressed by means of a press tester set to 120° C. and cooled to obtain a test piece, which was then subjected to the evaluation test. The results are shown in Table 1 together with those of other Examples and Comparative Examples.

EXAMPLE 2

Example 1 was repeated except that the polyol compound-1 (4 parts by weight) was replaced by 3,3-dimethylolheptane-adipic acid polycondensate (hereinafter referred to as polyol compound-2) as a polyester polyol (11 parts by weight) having a molecular weight of 8,500 and a hydroxyl group value of 11.9 KOH mg/g), to prepare a composition, followed by preparation of a test piece and its evaluation test. The results are shown in Table 1.

EXAMPLE 3

Example 1 was repeated except that the polyol compound-1 (4 parts by weight) was replaced by Acrydic 52-614 ® (made by DIC Co., Ltd.) (hereinafter referred to as polyol compound-3) as an acrylpolyol (10 parts by weight), having a hydroxyl value of 17.5 KOH mg/g to prepare a composition, followed by preparation of a test piece and its evaluation test. The results are shown in Table 1.

EXAMPLE 4

Example 1 was repeated except that 3-methyl-1,5-pentanediol-adipic acid polycondensate having a molecular weight of 3,000 and a hydroxyl group value of 36.1 KOH mg/g (Kurapol P-3010 ® made by Kuraray Co., Ltd.) (hereinafter referred to as polyol compound-4) (80 parts by weight) as a polyester polyol was used in place of polyol compound-1 (4 parts by weight), the crosslinking agent was used in a quantity of 60 parts by weight and no DOP was used, to prepare a composition, prepare test pieces and carry out their evaluation test. The results are shown in Table 1.

COMPARATIVE EXAMPLES 1-3

Example 1 was repeated except that the polyol compound-1 and the crosslinking agent were both not used (Comparative example 1); only the crosslinking agent was not used (Comparative example 2); or only the polyol compound-1 was not used (Comparative example 3), to prepare compositions, followed by preparation of test pieces and their evaluation tests. The results are shown in Table 1 together with those of Examples 1-4.

EXAMPLE 5

Vinyl chloride monomer (99.5 mol %) and 2-hydroxyethyl acrylate (0.5 mol %) were subjected to suspension polymerization at 51° C. to obtain a crosslinkable vinyl chloride copolymer resin having a polymerization degree of 1,300 and containing 6 hydroxyl groups on average per one molecule (hereinafter referred to as crosslinkable PVC-2).

With this crosslinkable PVC-2 (100 parts by weight) were mixed polyol compound-4 (10 parts by weight), a crosslinking agent (10 parts by weight) and DOP, Ba-Zn stabilizer and Ba-Zn chelator (70 parts by weight, 2 parts by weight and one part by weight, respectively), in a Henschel mixer, followed by melt-kneading the mixture by means of a twin-screw extruder in different directions set to 140° C. to 160° C. to obtain a composition.

A portion of the composition was made into a film by means of a roll tester set to 170° C., followed by compressing the film by means of a press tester set to 180° C. and then cooling to obtain a test piece. Further, another portion of the composition was extrusion-molded by means of a single-screw extruder set to 160° to 180° C. to obtain a test piece. These test pieces were subjected to evaluation test. The results are shown in Table 2.

EXAMPLE 6

Example 5 was repeated except that a crosslinkable vinyl chloride copolymer resin obtained by subjecting vinyl chloride monomer (99.7 mol %) and 2-hydroxyethyl acrylate (0.3 mol %) to suspension polymerization and having a polymerization degree of 1,300 and containing 3 hydroxyl groups on average per molecule (hereinafter referred to as PVC-3) (100 parts by weight) was used in place of crosslinkable PVC-2, and the crosslinking agent was used in 7 parts by weight, to obtain a composition, followed by preparing a test piece and carrying out evaluation test. The results are shown in Table 2.

EXAMPLE 7

Example 5 was repeated except that the crosslinking agent was used in a quantity of 7 parts by weight based upon the total 100 parts by weight of crosslinkable PVC-2 (50 parts by weight) and a vinyl chloride resin having a polymerization degree of 2,500 (hereinafter referred to as PVC) (50 parts by weight), to obtain a composition, followed by preparing a test piece and carrying out evaluation test. The results are shown in Table 2.

EXAMPLE 8

Example 5 was repeated except that a crosslinkable vinyl chloride copolymer resin obtained by subjecting vinyl chloride monomer (98.5 mol %) and 2-hydroxyethyl acrylate (1.5 mol %) to suspension polymerization at 40° C. and having a polymerization degree of 2,500 and containing 34 hydroxyl groups on average per one molecule (hereinafter referred to as crosslinkable PVC-4) was prepared and used in place of crosslinkable PVC-2, and polyol compound-4 (15 parts by weight) and the crosslinking agent (18 parts by weight) were used based upon the total 100 parts by weight of the above crosslinkable PVC-4 (70 parts by weight) and PVC (30 parts by weight), to obtain a composition, followed by preparing a test piece and carrying out evaluation test. The results are shown in Table 2.

EXAMPLE 9

Example 5 was repeated except that a crosslinkable vinyl chloride copolymer resin obtained by subjecting vinyl chloride monomer (85 mol %) and 2-hydroxyethyl acrylate (15 mol %) to suspension polymerization at 63° C. and having a polymerization degree of 800 and containing 120 hydroxyl groups on average per one molecule (hereinafter referred to as PVC-5) (30 parts by weight) in place of the crosslinkable PVC-2, and PVC (70 parts by weight) (100 parts in total) were used, to obtain a composition, followed by preparing a test piece and carrying out evaluation test. The results are shown in Table 2.

COMPARATIVE EXAMPLE 4

Example 5 was repeated except no crosslinkable PVC was used, and PVC (100 parts by weight) and the crosslinking agent (5 parts by weight) were used, to obtain a composition, followed by preparing a test piece and carrying out evaluation test. The results are shown in Table 2 together with those of Examples 5-9.

EXAMPLE 10

Example 5 was repeated except that DOP (60 parts by weight), polyol compound-4 (20 parts by weight) and the crosslinking agent (12 parts by weight) were used based upon the total 100 parts by weight of crosslinkable PVC-2 (70 parts by weight) and PVC (30 parts by weight), to obtain a composition, followed by preparing a test piece and carrying out evaluation test. The results are shown in Table 3.

EXAMPLE 11

Example 5 was repeated except that the crosslinking agent (11 parts by weight) was used based upon the total 100 parts by weight of crosslinkable PVC-2 (50 parts by weight) and PVC (50 parts by weight), to obtain a composition, followed by preparing a test piece and carrying out evaluation tests. The results are shown in Table 3.

EXAMPLES 12 and 13

Example 10 was repeated except that the crosslinking agent (10 parts by weight) and DOP (60 parts by weight) (Example 12) or DOP (100 parts by weight) (Example 13) were used based upon the total 100 parts by weight of crosslinkable PVC-2 (30 parts by weight) and PVC (70 parts by weight), to obtain compositions, followed by preparing test pieces and carrying out evaluation tests. The results are shown in Table 3.

EXAMPLES 14 and 15

Example 12 was repeated except that a partially crosslinked type NBR (50 parts by weight in Example 14) or powder nitrile rubber (PN-C-38) (made by Japan Synthetic Rubber Co., Ltd.) (150 parts by weight in Example 15) (hereinafter these being referred to as NBR) was further added as a rubbery material, to prepare compositions, followed by preparing test pieces and carrying out evaluation tests. The results are shown in Table 3.

COMPARATIVE EXAMPLE 5

With PVC (100 parts by weight) were blended DOP (60 parts by weight), Ba-Zn stabilizer (2 parts by weight), Ba-Zn chelator (one part by weight) and further, NBR (50 parts by weight), to prepare a composition, followed by preparing a test piece and carrying out evaluation test, in the same manner as in Examples 10-15. The results are shown in Table 3 together with those of Examples 10-15.

As apparent from Tables 1-3, in Examples 1-15, any of the values of the compression set are far less than and superior to those of Comparative examples 1-5, and the values of the percentages of heat deformation are also less than and hence superior to those of Comparative examples 1, 2, 4 and 5 and further, the values of the tensile strength of Examples 1-4 are larger than and hence superior to those of Comparative examples 1 and 2, those of Examples 5-9 are so to those of Comparative example 4 and those of Examples 10-12 are so to those of Comparative example 5. The values of the tensile strength of Examples 14 and 15 are inferior to those of Comparative example 5, but these values have no obstacle to practical use. In Comparative example 3, the percentage of heat deformation and the tensile strength are superior, but the compression set is not only inferior to those of Examples 1-15, but also in the appearance of a pressed film, melt unevenness occurs and the surface smoothness is inferior.

In addition, with regard to the processability, too, as judged from the appearance of the pressed film and the appearance of the extrusion-molded product, it is evident that the processabilities of Examples 1-15 are far superior to that of Comparative example 3, and in the case of a high content of PVC content (e.g. see Examples 7, 11 and 12) and in the case of simultaneous use of NBR (e.g. see Examples 14 and 15), the processabilities are not inferior to those of usual vinyl chloride resin compositions (e.g. see Comparative examples 1 and 2). Further, referring to the wear resistance, it is evident that the wear resistances of Examples 1-15 are superior to those of usual vinyl chloride resin compositions (e.g. see Comparative examples 1 and 2).

As described above, the composition of the present invention is superior in the compression set, heat deformation properties, tensile strength and wear resistance and is useful as materials for automobiles, machines, electrical products, medical products, architecture, etc.

TABLE 1

| | Example | | | | Comparative Example | | |
|---|---|---|---|---|---|---|---|
| | 1 | 2 | 3 | 4 | 1 | 2 | 3 |
| Blending (parts by weight) | | | | | | | |
| Crosslinkable PVC-1 | 100 | 100 | 100 | 100 | 100 | 100 | 100 |
| DOP | 50 | 50 | 50 | | 50 | 50 | 50 |
| Ba—Zn stabilizer | 2 | 2 | 2 | 2 | 2 | 2 | 2 |
| Ba—Zn chelator | 1 | 1 | 1 | 1 | 1 | 1 | 1 |
| Polyol compound-1 | 4 | | | | | 4 | |
| Polyol compound-2 | | 11 | | | | | |
| Polyol compound-3 | | | 10 | | | | |
| Polyol compound-4 | | | | 80 | | | |
| Crosslinking agent | 10 | 10 | 10 | 60 | | | 10 |
| Compression set (%) | 28 | 25 | 26 | 31 | 70 | 71 | 53 |
| % of heat deformation (%) | 6 | 6 | 5 | 5 | 19 | 22 | 6 |
| Tensile strength (Kg/cm$^2$) | 180 | 180 | 200 | 190 | 170 | 160 | 200 |
| Appearance of pressed film | ○ | ○ | ○ | ○ | ⊚ | ⊚ | X |
| Wear resistance | ○ | ○ | ○ | ⊚ | X | X | ○ |

TABLE 2

| | Example | | | | | Comp. ex. |
|---|---|---|---|---|---|---|
| | 5 | 6 | 7 | 8 | 9 | 4 |
| Blending (parts by weight) | | | | | | |
| Crosslinkable PVC-2 | 100 | | 50 | | | |
| Crosslinkable PVC-3 | | 100 | | | | |
| Crosslinkable PVC-4 | | | | 70 | | |
| Crosslinkable PVC-5 | | | | | 30 | |
| PVC | | | 50 | 30 | 70 | 100 |
| DOP | 70 | 70 | 70 | 70 | 70 | 70 |
| Ba—Zn stabilizer | 2 | 2 | 2 | 2 | 2 | 2 |
| Ba—Zn chelator | 1 | 1 | 1 | 1 | 1 | 1 |
| Polyol compound-4 | 10 | 10 | 10 | 15 | 10 | 10 |
| Crosslinking agent | 10 | 7 | 7 | 81 | 10 | 5 |
| Compression set (%) | 32 | 37 | 46 | 40 | 45 | 62 |
| % of heat deformation (%) | 5 | 5 | 7 | 6 | 7 | 14 |
| Tensile strength (Kg/cm$^2$) | 150 | 140 | 140 | 145 | 140 | 130 |
| Appearance of extrusion-molded product | ○ | ○ | ⊚ | ○ | ○ | ⊚ |
| Wear resistance | ○ | ○ | ○ | ○ | ○ | ○ |

TABLE 3

| | Example | | | | | | Comp. ex. |
|---|---|---|---|---|---|---|---|
| | 10 | 11 | 12 | 13 | 14 | 15 | 5 |
| Blending (parts by weight) | | | | | | | |
| Crosslinkable PVC | 70 | 50 | 30 | 30 | 30 | 30 | |
| PVC | 30 | 50 | 70 | 70 | 70 | 70 | 100 |
| DOP | 60 | 60 | 60 | 150 | 60 | 80 | 60 |
| Ba—Zn stabilizer | 2 | 2 | 2 | 2 | 2 | 2 | 2 |
| Ba—Zn chelator | 1 | 1 | 1 | 1 | 1 | 1 | 1 |
| Polyol compound-4 | 20 | 20 | 20 | 20 | 20 | 20 | |
| Crosslinking agent | 12 | 11 | 10 | 10 | 10 | 10 | |
| NBR | | | | | 50 | 150 | 50 |
| Compression set (%) | 46 | 49 | 48 | 45 | 43 | 35 | 50 |
| % of heat deformation (%) | 5 | 6 | 6 | 7 | 5 | 5 | 11 |
| Tensile strength (Kg/cm$^2$) | 145 | 150 | 150 | 110 | 120 | 105 | 130 |

TABLE 3-continued

| | Example | | | | | | Comp. ex. |
|---|---|---|---|---|---|---|---|
| | 10 | 11 | 12 | 13 | 14 | 15 | 5 |
| Appearance of extrusion-molded product | ◯ | ⊙ | ⊙ | ⊙ | ⊙ | ⊙ | ⊙ |
| Wear resistance | ◯ | ◯ | ◯ | ◯ | ⊙ | ⊙ | ◯ |

What we claim is:

1. A vinyl chloride resin composition comprising 1 to 100 parts by weight of a polyol compound and 1 to 100 parts by weight of a crosslinking agent blended with 100 parts by weight in total of 1 to 100 parts by weight of a crosslinkable vinyl chloride resin and 99 to 0 parts by weight of a vinyl chloride resin, wherein said crosslinkable vinyl chloride resin is a copolymer of vinyl chloride monomer with an active hydrogen atom-containing unsaturated monomer.

2. A composition according to claim 1, wherein said crosslinkable vinyl chloride resin is a copolymer of 99.98 to 50 mol % of vinyl chloride monomer with 0.02 to 50 mol % of an active hydrogen atom-containing unsaturated monomer.

3. A composition according to claim 1, wherein said crosslinking agent comprises a polyisocyanate compound.

4. A composition according to claim 1, further comprising 0 to 200 parts by weight of a plasticizer.

5. A composition according to claim 1, further comprising 0 to 200 parts by weight of a rubbery material.

6. A composition according to claim 2, wherein said crosslinkable vinyl chloride resin has an average polymerization degree of 300 to 5,000.

7. A composition according to claim 1, wherein said active hydrogen atom-containing unsaturated monomer comprises an unsaturated monomer containing at least one carboxyl group, and unsaturated monomer containing an hydroxyl group or an unsaturated monomer containing an amido group.

8. A composition according to claim 7, wherein said active hydrogen atom-containing unsaturated monomer is 2-hydroxyethyl acrylate.

9. A composition according to claim 8, wherein said crosslinkable vinyl chloride resin is a copolymer of 99.5 mol % of vinyl chloride monomer with 0.5 mol % of 2-hydroxyethyl acrylate.

10. A composition according to claim 1, wherein said polyol compound comprises a polyether polyol, a polyester polyol, an acrylic polyol or a substance having a rubber material modified with hydroxyl groups.

11. A composition according to claim 1, wherein said polyol compound comprises ethylene glycol, diethylene glycol, triethylene glycol, 1,2-propylene glycol, dipropylene glycol trimethylene glycol, 1,4-butylene glycol, 1,3-butylene glycol, tetramethylene glycol, neopentyl glycol, hexamethylene glycol, decamethylene glycol, glycerine, trimethylol propane, pentaerythritol or sorbitol.

12. A composition according to claim 1, wherein said polyol compound comprises 3,3-dimethylolheptane-adipic acid polycondensate.

13. A composition according to claim 11, wherein said polyol compound comprises 3-methyl-1,5-pentanediol-adipic acid polycondensate.

14. A composition according to claim 11, wherein said polyol compound comprises an acrylpolyol.

15. A composition according to claim 5, wherein said rubbery material comprises a powder nitrile rubber or a partially crosslinked type nitrile-butadiene rubber.

16. A composition according to claim 1, wherein said crosslinkable vinyl chloride resin comprises a copolymer of (a) vinyl chloride monomer, (b) an active hydrogen atom-containing unsaturated monomer and (c) an unsaturated monomer selected from the group consisting of an α-olefin, a vinylidene monomer, a vinyl aryl compound and an unsaturated nitrile.

17. A composition according to claim 3, wherein said crosslinking agent comprises a non-yellowing type isocyanate prepolymer.

* * * * *

UNITED STATES PATENT AND TRADEMARK OFFICE
CERTIFICATE OF CORRECTION

PATENT NO. : 5,242,965
DATED : September 7, 1993
INVENTOR(S) : ITO et al.

It is certified that error appears in the above-identified patent and that said Letters Patent is hereby corrected as shown below:

Column 11, line 39, change "and" to --an--.

Signed and Sealed this

Twenty-second Day of November, 1994

Attest:

BRUCE LEHMAN

*Attesting Officer*  *Commissioner of Patents and Trademarks*